(12) United States Patent
Cao et al.

(10) Patent No.: US 11,735,935 B2
(45) Date of Patent: Aug. 22, 2023

(54) CHARGING COUPLING

(71) Applicant: Globe (Jiangsu) Co., Ltd, Jiangsu (CN)

(72) Inventors: Jin Cao, Jiangsu (CN); Jie Gao, Jiangsu (CN); Wanghao Li, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 412 days.

(21) Appl. No.: 17/025,630

(22) Filed: Sep. 18, 2020

(65) Prior Publication Data
US 2021/0083490 A1 Mar. 18, 2021

(30) Foreign Application Priority Data
Sep. 18, 2019 (CN) .......................... 201910882373.9

(51) Int. Cl.
| | | |
|---|---|---|
| *H02J 7/00* | (2006.01) | |
| *A01D 34/00* | (2006.01) | |
| *A01D 69/02* | (2006.01) | |
| *B60L 53/16* | (2019.01) | |
| *A01D 101/00* | (2006.01) | |

(52) U.S. Cl.
CPC .......... *H02J 7/0042* (2013.01); *A01D 34/001* (2013.01); *A01D 69/02* (2013.01); *A01D 2101/00* (2013.01); *B60L 53/16* (2019.02)

(58) Field of Classification Search
CPC ....... H02J 7/0042; A01D 34/001; B60L 53/16
USPC ......................................................... 320/109
See application file for complete search history.

(56) References Cited

U.S. PATENT DOCUMENTS

| | | | |
|---|---|---|---|
| 9,543,680 B2 | 1/2017 | Elonsson | |
| 2015/0229148 A1* | 8/2015 | Icoz ...................... | H02J 7/0044 320/137 |
| 2016/0039541 A1* | 2/2016 | Beardsley .............. | G05D 1/042 701/2 |

FOREIGN PATENT DOCUMENTS

| | | |
|---|---|---|
| CN | 102948301 B | 2/2016 |
| EP | 0591723 A2 | 4/1994 |
| EP | 2602883 A1 | 6/2013 |
| EP | 2571344 B1 | 9/2017 |
| WO | 2011044803 A1 | 4/2011 |

* cited by examiner

*Primary Examiner* — Suchin Parihar

(57) ABSTRACT

The present invention provides a charging coupling including a first charging assembly, the first charging assembly including a first elastic terminal and a second elastic terminal, a receiving space being formed between the first elastic terminal and the second elastic terminal, a tapered opening being provided on one side of the first charging assembly, the tapered opening communicating with the receiving space; and a second charging assembly adapted to the first charging assembly, one side of the second charging assembly being provided with a protrusion, a third elastic terminal and a fourth elastic terminal disposed on the protrusion, the third elastic terminal including a first convex portion and fourth elastic terminal including a second convex portion, and the convex portion being used for inserting into the receiving space from the tapered opening.

9 Claims, 5 Drawing Sheets

CHARGING COUPLING

CROSS-REFERENCE TO RELATED INVENTIONS

This invention is a US invention which claims the priority of CN invention Serial No. 201910882373.9, filed on Sep. 18, 2019, the disclosures of which are hereby incorporated by reference in their entirety.

TECHNICAL FIELD

The present invention relates to a robotic garden tools, in particular to a charging coupling for connecting a robotic garden tool with a charging station.

BACKGROUND ART

The robotic garden tools, such as, but not limited to, robotic lawnmowers are widely used for grass cutting applications in a lawn. Typically, a robotic lawnmower is an autonomous robotic garden tool and uses a battery as the power source. Based on the operating load and duration, the battery of the robotic lawnmower may get discharged periodically. A battery power level may be continuously monitored to identify the need of charging the battery by a charging coupling. It may be required to charge the battery in case the battery power level falls below a threshold power level during operation.

Typically, an arrangement for charging of the battery of the robotic lawnmower involves a metal plate mounted to the robotic lawnmower and the charging terminal with at last two resilient contacting bars mounted to the charging coupling. The electric current may be transferred between the charging contacts of the metal plate and the contacting bars of the charging terminal to charge the battery of the robotic lawnmower. In other words, electric current may be transferred from the contacting bars of the charging station to the metal plate of the robotic lawnmower.

However, in this arrangement, the charging terminal is configured with L shape and located at the same row and the contacting bars bend upwardly from the charging terminal, the metal plate may not contact with the contacting bars of the charging terminal well when the contacting bars lose elasticity after long-term misaligned and the electrical connection between the metal plate and the charging terminal may not be achieved.

Therefore, it is necessary to provide an improved system to charge a robotic garden tool, which will overcome the disadvantages mentioned above.

SUMMARY OF INVENTION

The object of the present invention is to provide a charging coupling for easily and accurately connecting a robotic garden tool to a charging station for achieving a stable electrical connection between the robotic garden tool and the charging station.

In order to achieve the above objective, a charging coupling for a robotic device, comprising: a first charging assembly, the first charging assembly including a first elastic terminal and a second elastic terminal, a receiving space being formed between the first elastic terminal and the second elastic terminal, a tapered opening being provided on one side of the first charging assembly, the tapered opening communicating with the receiving space, and a second charging assembly adapted to the first charging assembly, one side of the second charging assembly being provided with a protrusion, a third elastic terminal and a fourth elastic terminal disposed on the protrusion, the third elastic terminal including a first convex portion and fourth elastic terminal including a second convex portion, and the convex portion being used for inserting into the receiving space from the tapered opening, so that the first elastic terminal and the second elastic terminal are respectively in elastic contact with the third elastic terminal and the fourth elastic terminal.

The beneficial effect of the present invention is that: the first elastic assembly, the second elastic assembly, the third elastic assembly, and the fourth elastic assembly all have elasticity to form elastic contact and avoid unstable contact. One side of the first charging assembly is provided with a tapered opening, which avoids the difficulty in docking when the second charging assembly is docked from the center position of the first charging assembly. The third elastic terminal and the fourth elastic terminals are respectively provided with a first convex portion and a second convex portion, which prevents the second charging assembly from being separated from the first charging assembly during the charging process.

Preferably, all terminals (the first elastic terminal, the second elastic terminal, the third elastic terminal and the fourth elastic terminal) are bent metal sheets. The beneficial effect is that the metal sheet increases the contact area and avoids unstable contact.

Preferably, the first elastic terminal includes a first fixing portion and a first contact portion, and the first contact portion includes a first initial contact portion and a first charging contact portion. The first charging contact portion is connected to the first fixing portion through the first initial contact portion. The beneficial effect is that the first contact portion includes a first initial contact portion and a first charging contact portion, which ensures sufficient contact between the first contact portion and the third elastic terminal and avoids poor contact.

Preferably, the second elastic terminal includes a second fixing portion and a second contact portion, and the second contact portion includes a second initial contact portion and a second charging contact portion. The second charging contact portion is connected to the second fixing portion through the second initial contact portion. The beneficial effect is that the second contact portion includes a second initial contact portion and a second charging contact portion, which ensures sufficient contact between the second contact portion and the fourth elastic terminal and avoids poor contact.

Preferably, the angle between the first charging contact portion and the second charging contact portion is smaller than that between the first initial contact portion and the second charging contact portion. The angle between the initial contact portion and the second initial contact portion is smaller than that of the tapered opening. The beneficial effect is to facilitate the insertion of the protrusion, so that the first elastic terminal and the second elastic terminal are in elastic contact with the third elastic terminal and the fourth elastic terminal, respectively, so as to avoid poor contact.

Preferably, the first contact portion further comprises a first bent tail portion, and the first bent tail portion is connected to the first charging contact portion. The second contact portion further includes a second bent tail portion, and the second bent tail is connected to the second charging contact portion. Both The first bent tail portion and the second bent tail portion face away from the receiving space.

The beneficial effect is to prevent the first charging contact portion and the second charging contact portion from catching the protrusion.

Preferably, the third elastic terminal is hook-shaped. The third elastic terminal includes a third fixing portion and a first hook portion. The first convex portion is located at one end of the third fixing portion connected with the first hook portion, and the other end of the third fixing portion is provided with a first fixing port. The beneficial effect is that the first hook portion facilitates the insertion of the third elastic terminal into the embedded groove, and reduces the blocking of the third elastic terminal by the first assembly.

Preferably, the fourth elastic terminal is hook-shaped. The fourth elastic terminal includes a fourth fixing portion and a second hook portion. The second convex portion is located at one end of the fourth fixing portion connected with the second hook portion. The other end of the fourth fixing part is provided with a second fixing port. The beneficial effect is that the second hook portion facilitates the insertion of the fourth elastic terminal into the embedded groove, and reduces the blocking of the fourth elastic terminal by the first assembly.

Preferably, the protrusion comprises a terminal fixing assembly. The beneficial effect is that it is convenient to fix the third elastic terminal and the fourth elastic terminal.

Preferably, the terminal fixing assembly comprises a first fixing plate, a second fixing plate and a built-in plate, and the first fixing plate and the second fixing plate are arranged on both sides of the built-in plate. A first embedded groove is provided between the first fixing plate and the built-in plate, and a first fixed buckle is provided on the side of first fixing plate facing away from the built-in plate. The first hook portion is embedded in the first embedded groove, and the first fixing port is detachably connected to the first fixed buckle. A second embedded groove is provided between the second fixed plate and the built-in plate, and a second fixing buckle is provided on the side of the second fixed plate facing away from the built-in plate. The second hook portion is embedded in the second embedded groove, and the second fixing port and the second fixing buckle are detachably connected. The beneficial effect is that it is convenient to fix the third elastic terminal and the fourth elastic terminal, and prevents the third elastic terminal and the fourth elastic terminal from falling off.

Preferably, there are two contact portions between the first elastic terminal and the third elastic terminal. The first contact portion is the connecting portion between the first initial contact portion and the first charging contact portion which is in elastic contact with the third fixing portion, and the second contact portion is the portion where the first charging contact portion is in elastic contact with the first convex portion. The beneficial effect is that the two contact portions increase the stability of the contact between the first elastic terminal and the third elastic terminal.

Preferably, there are two contact portions between the second elastic terminal and the fourth elastic terminal. The first contact portion is the connecting portion between the second initial contact portion and the second charging contact portion which is in elastic contact with the fourth fixing part, and the second contact portion is the portion where the second charging contact portion is in elastic contact with the second convex portion. The beneficial effect is that the two contact portions increase the stability of the contact between the second elastic terminal and the fourth elastic terminal.

DESCRIPTION OF EMBODIMENT

In order to make the objectives, technical solutions and advantages of the present invention clearer, the technical solutions in this embodiment of the present invention will be described clearly and completely with reference to the accompanying drawings of the present invention. Obviously, the described embodiment is only part of the present invention. Based on the embodiment of the present invention, all other embodiment obtained by those of ordinary skill in the art without creative work shall fall within the protection scope of the present invention. Unless otherwise defined, the technical or scientific terms used herein shall have the usual meanings understood by those with ordinary skills in the field to which the present invention belongs. As used herein, "comprising" and other similar words mean that the elements or objects appearing before the word encompass the elements or objects listed after the word and their equivalents, without excluding other elements or objects.

A robotic device, embodied as a robotic mower, is configured to move autonomously with in a working area. It is provided with an internal and recharge power supply, such as a battery. When the robotic mower is docked to a charging station, the battery could be charged through a charging coupling. In view of the problems in the prior art, an embodiment of the present invention provides a charging coupling, which includes a first charging assembly 10 and a second charging assembly 20 adapted to the first charging assembly. A purpose of a charging coupling is to receive electric current from the charging station, and forward it to the battery. The first charging assembly 10 is mounted on one of the robotic mowers or charging stations and the second charging assembly 20 is mounted on the other.

Figure 1:
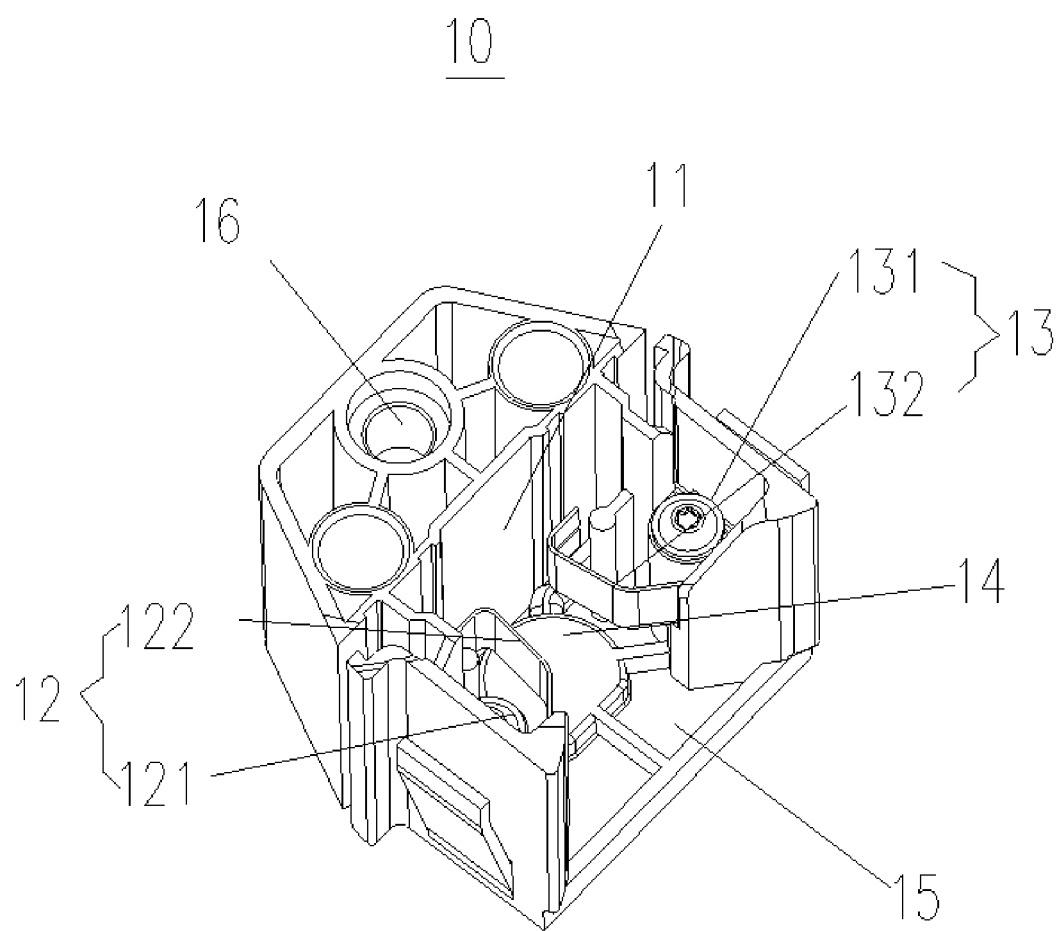
FIG. 1 is a cross-sectional view of a first charging assembly of a charging coupling according to the present invention.

Refer to FIG. 1 now, in an embodiment of the present invention, the first charging assembly 10 has a symmetrical structure, and the first charging assembly 10 is provided with an accommodating cavity 11. The accommodating cavity 11 is provided with a first elastic terminal assembly 12 and a second elastic terminal assembly 13. The first elastic terminal assembly 12 includes a first groove 121 and a first elastic terminal 122, and the first groove 121 is formed in the accommodating cavity 11. The first elastic terminal 122 is fixed in the first groove 121. The second elastic terminal assembly 13 includes a second groove 131 and a second elastic terminal 132, and the second groove 131 is formed in the accommodating cavity 11. The second elastic terminal 132 is fixed in the second groove 131. A receiving space 14 is formed between the first elastic terminal 122 and the second elastic terminal 132. A tapered opening 15 is provided at one side of the first charging assembly 10, which communicates with the receiving space 14. A first mounting portion 16 is provided at the another side of the first charging assembly 10 opposite to the tapered opening 15.

In some embodiment of the present invention, the first mounting portion 16 is installed on the charging station or the robotic device.

Figure 2:
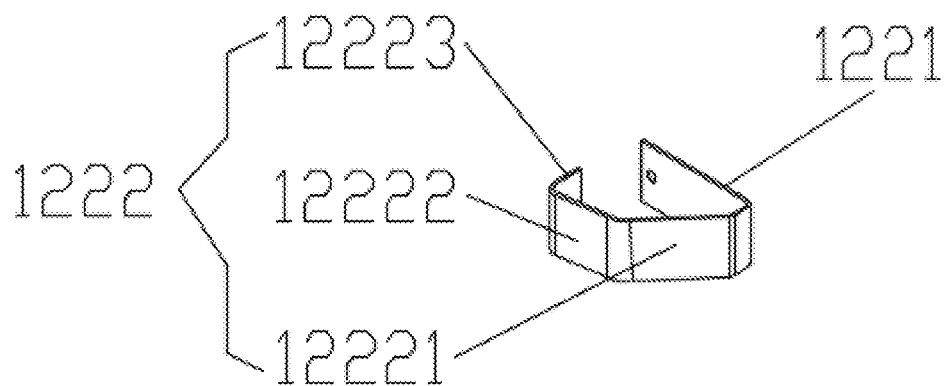
FIG. 2 is a perspective view of a first elastic terminal of the present invention.

Refer to FIG. 1 and FIG. 2 now, the first elastic terminal 122 includes a first fixing portion 1221 and a first contact portion 1222, and the first contact portion 1222 includes a first initial contact portion 12221 and a first charging contact portion 12222. The first charging contact portion 12222 is connected to the first fixing portion 1221 through the first initial contact portion 12221. The first fixing portion 1221 is fixed in the first groove 121, and the first contact portion 1222 also includes a first bent tail portion 12223 which is connected to the first charging contact portion 12222. The first fixing portion 1221 and the first initial contact portion 12221 form a first rounded corner (not marked in the figure). The angle of the first rounded corner is less than 90 degrees. The first initial contact portion 12221 and the first charging contact portion 12222 form a second rounded corner (not marked in the figure). The angle of the second rounded corner is greater than 90 degrees and less than 180 degrees. The first bent tail portion 12223 faces away from the receiving space 14. The angle of the rounded corner should be understood as the angle at which the extension lines of the two sides of the rounded corner intersect.

In some embodiment of the present invention, the second elastic terminal 13 and the first elastic terminal 12 have the same structure. Specifically, the second elastic terminal 13 includes a second fixing portion and a second contact portion, and the second contact portion includes a second initial contact portion and a second charging contact portion. The second charging contact portion is connected to the second fixing portion through the second initial contact portion, and the second fixing portion is fixed to the second groove. The second contact portion further includes a second bent tail portion. The second bent tail portion is connected to the second charging contact portion. A third rounded corner is formed between the second fixing portion and the second initial contact portion. The angle of the third rounded corner is less than 90 degrees. The second initial contact portion and the second charging contact portion form a fourth rounded corner, and the angle of the fourth rounded corner angle is greater than 90 degrees and less than 180 degrees. The second bent tail portion faces away from the receiving space 14. The angle of the rounded corner should be understood as the angle at which the extension lines of the two sides of the rounded corner intersect. Since the second elastic terminal 13 has the same structure as the first elastic terminal 12, it is not shown in figure.

In some embodiment of the present invention, both the first fixing part 1221 and the second fixing part are provided with a first threading hole. The first threading hole is used for connecting with an electrical cord.

In some embodiments of the present invention, the first fixing portion 1221 is parallel to the second fixing portion. The angle between the first charging contact portion 12222 and the second charging contact portion is smaller than that between the first initial contact portion 12221 and the second initial contact portion. The angle between the first initial contact portion 12221 and the second initial contact portion is smaller than the angle of the tapered opening. The angle between the first charging contact portion 12222 and the second charging contact portion should be understood as the angle at which the extension lines of the two intersect. The angle between the first initial contact portion 12221 and the second initial contact portion should be understood as the angle at which the extension lines of the two intersect. The angle of the tapered opening should be understood as the angle at which the extension lines of the two hypotenuses of the tapered opening intersect.

Figure 3:
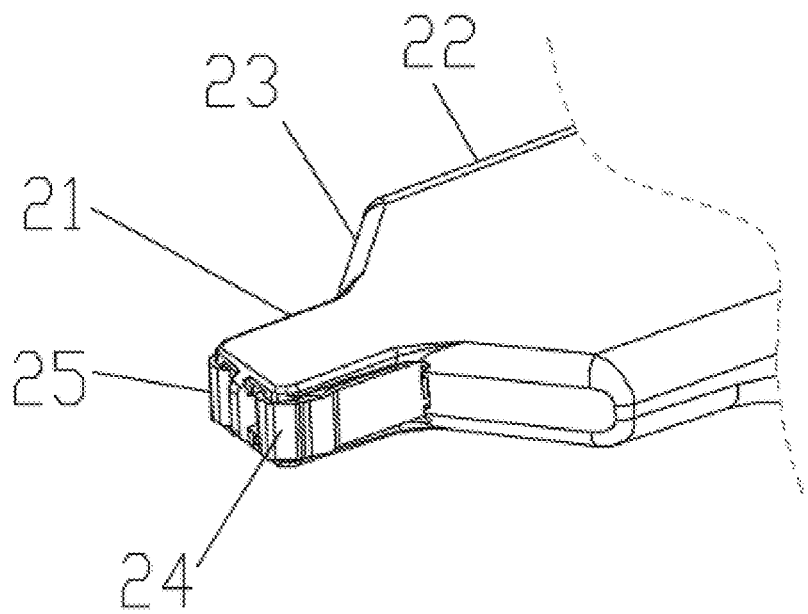
FIG. 3 is a schematic structure diagram of the second charging assembly of the present invention.

Refer to FIG. 3, in an embodiment of the present invention, the second charging assembly 20 has a symmetrical structure. One side of the second charging assembly 20 is provided with a protrusion 21, and a second mounting portion 22 is provided at the opposite side of the protrusion 21. The protrusion 21 is connected to the second mounting portion 22 through a tapered portion 23. A third elastic terminal 24 and a fourth elastic terminal 25 are disposed on the protrusion 21.

In some embodiment of the present invention, the second mounting portion 22 is installed on the charging station or the robotic device.

In some specific embodiment of the present invention, the robotic device is a robotic mower.

Figure 4:
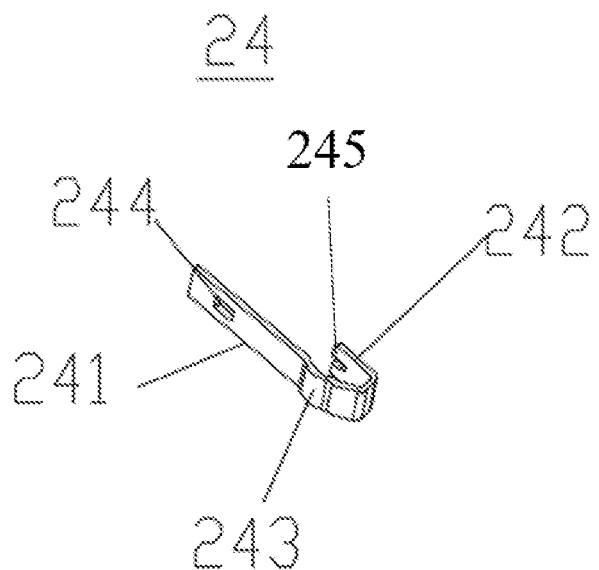
FIG. 4 is a schematic structure diagram of the third elastic terminal of the present invention.

Refer to FIG. 4, the third elastic terminal 24 is hook-shaped. The third elastic terminal 24 includes a third fixing portion 241 and a first hook portion 242. The third fixing portion 241 is provided with a first convex portion 243 and a first fixing port 244. The first convex portion 243 is located at one end of the third fixing portion 241 connected to the first hook portion 242, and the first convex portion 243 is located at the end of the third fixing portion 241 opposite to the side of the first hook portion 242. The first fixing port 244 is located at an end of the third fixing portion 241 away from the first hook portion 242.

In some embodiment of the present invention, the structure of the fourth elastic terminal 25 is the same as the structure of the third elastic terminal 24. Specifically, the fourth elastic terminal includes a fourth fixing portion and a second hook portion. The fourth fixing portion is provided with a second convex portion and a second fixing port. The second convex portion is located at one end of the fourth fixing portion connected to the second hook portion, and the second convex portion is located at the end of the fourth fixing portion opposite to the side of the second hook portion. The second fixing port is located at an end of the fourth fixing portion away from the second hook portion. Since the fourth elastic terminal 25 has the same structure as the third elastic terminal 24, it is not shown in figure.

In some embodiment of the present invention, both the third fixing portion 24 and the fourth fixing portion 25 are provided with a second threading hole, which is used for connecting with an electrical cord.

Figure 5:
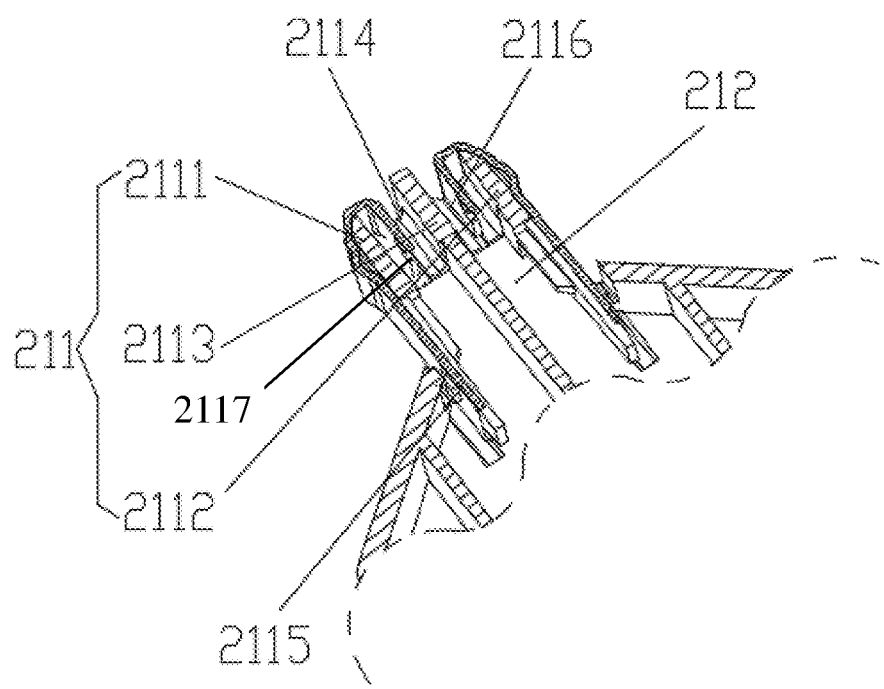
FIG. 5 is a cross-sectional view of the second charging assembly of the present invention.

Refer to FIG. 3 to FIG. 5, the protrusion 21 includes a terminal fixing assembly 211, a lower cover plate 212 and an upper cover plate (not shown in the figure). The terminal fixing assembly 211 is disposed between the lower cover plate 212 and the upper cover plate (not marked in the figure). The terminal fixing assembly 211 includes a first fixing plate 2111, a second fixing plate 2112, and a built-in plate 2113. The built-in plate 2113 is located between the first fixing plate 2111 and the second fixing plate 2112. A first embedded groove 2114 is located between the first fixing plate 2111 and the built-in plate 2113, and a first fixing buckle 2115 is provided on one side of the first fixing plate 2111 facing away from the built-in plate 2113. The first hook portion 242 is disposed in the first embedded groove 2114, and the first fixing port 244 is detachably connected with the first fixing buckle 2115. A second embedded groove 2116 is located between the second fixing plate 2112 and the built-in plate 2113. A second fixing buckle (not marked in the figure) is provided on one side of the second fixing plate 2112 facing away from the built-in plate 2113. The second hook portion (not marked in the figure) is received in the second embedded groove 2116, and the second fixing port (not marked in the figure) is detachably connected with the second fixing buckle (not marked in the figure).

In some embodiment of the present invention, the first hook portion 242 is provided with a first blocking opening 245. A first baffle 2117 is provided in the first embedded groove 2114, and the first baffle 2117 is matched with the first blocking opening 245, so the first hook portion 242 is prevented from moving up and down. The second hook portion is provided with a second blocking opening, and the second embedded groove is provided with a second baffle. The second baffle is received in the second blocking opening to prevent the second hook portion from moving up and down.

Figure 6:
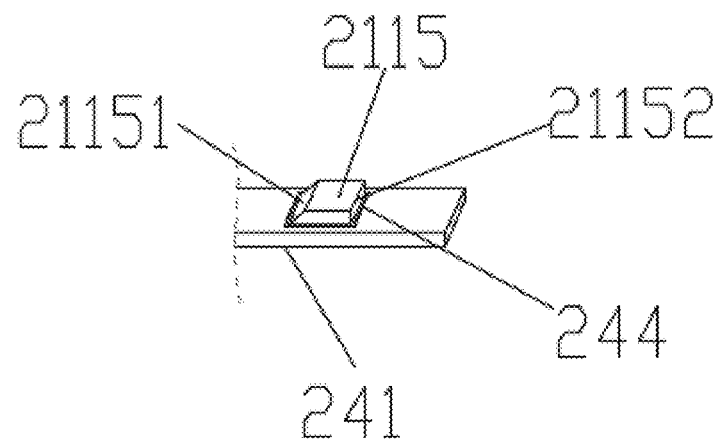
FIG. 6 is a schematic structural diagram of the first fixing buckle of the present invention.
Figure 7:
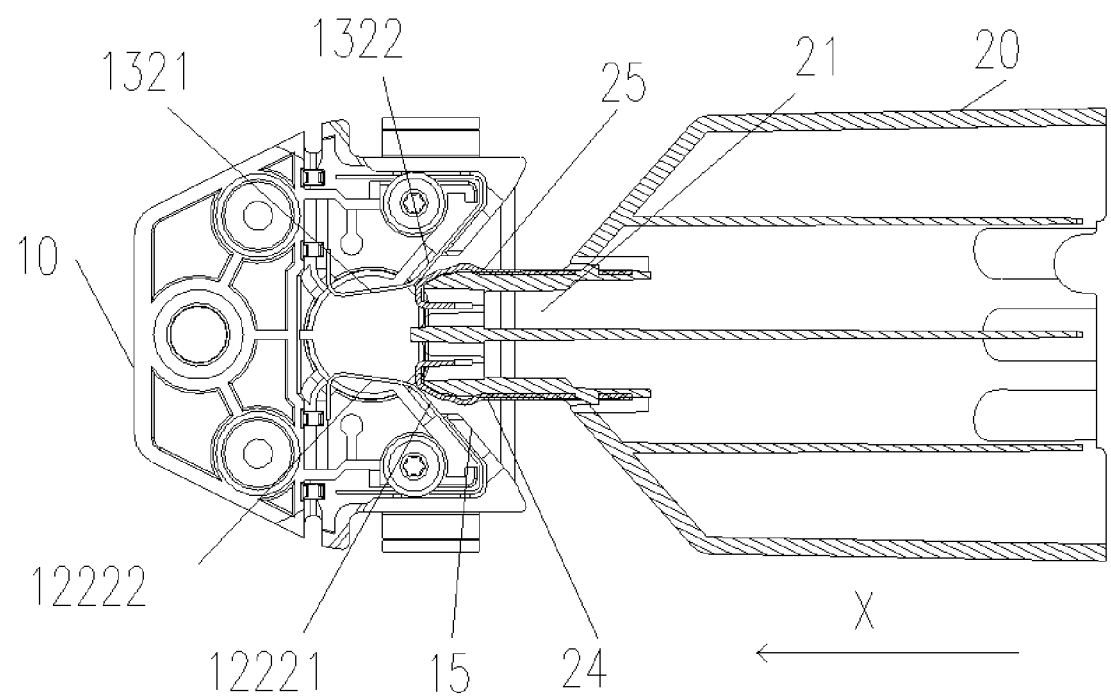
FIG. 7 is a schematic diagram of the first charging assembly and the second charging assembly in the first using process of the present invention.
Figure 8:
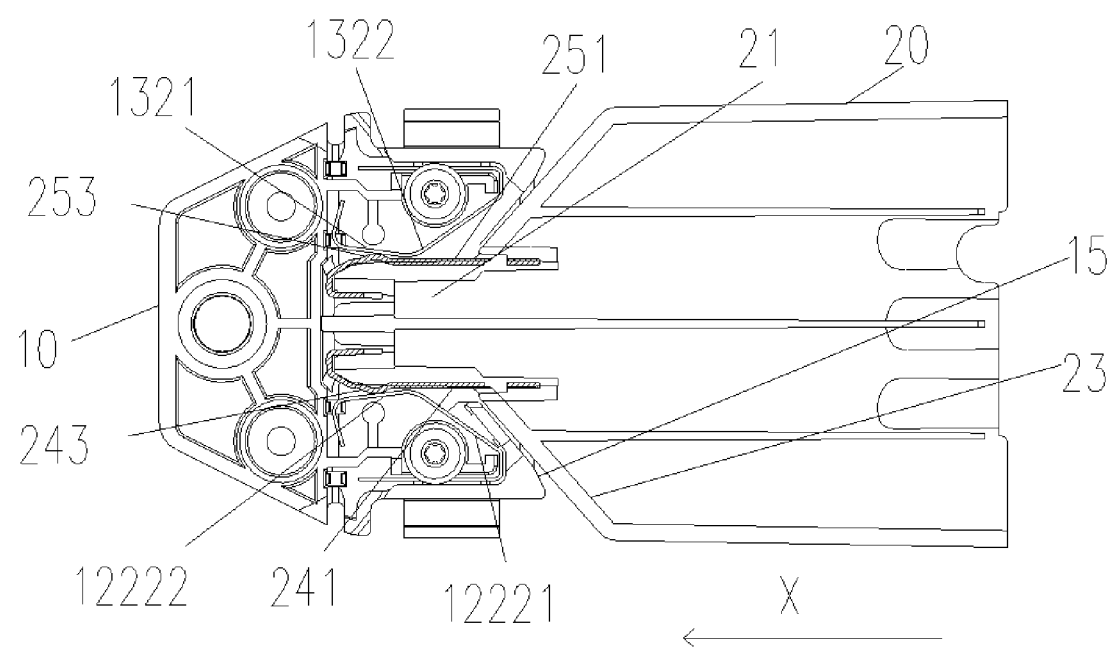
FIG. 8 is a schematic diagram of the first charging assembly and the second charging assembly in the second using process of the present invention.

Refer to FIG. 6, the first fixed buckle 2115 has an inclined surface 21151 and a vertical surface 21152 which are located on opposite sides of the first fixed buckle 2115, and the inclined surface 21151 faces the first hook portion 242. The inclined surface 21151 facilitates the first fixing buckle 2115 to be inserted into the first fixing port 244, and the vertical surface 21152 prevents the first fixing buckle 2115 from being separated from the first fixing port 244. The structure of the second fixing buckle is the same as that of the first fixed buckle.

Refer to FIG. 1, FIG. 2, FIG. 3 and FIG. 7, the distance between the first charging contact portion 12222 and the second charging contact portion 1321 is smaller than that between the third elastic terminal 24 and the fourth elastic terminal 25. The second charging assembly 20 is inserted into the first charging assembly 10 along the X direction. During the first using process of the charging coupling, the third elastic terminal 24 is in elastic contact with the first initial contact portion 12221, and the fourth elastic terminal 25 is in elastic contact with the second initial contact portion 1322. When the second charging assembly 20 is inserted into the first charging assembly 10 along the X direction, since the opening of the tapered opening 15 is larger, the protrusion 21 is easier to insert into the tapered opening 15. The protrusion 21 is guided through the conical opening 15 into the receiving space 14.

Refer to FIG. 1, FIG. 2, FIG. 4, and FIG. 8, the second charging assembly 20 is inserted into the first charging assembly 10 along the X direction. During the second using process of charging coupling, the protrusion 21 is inserted into the receiving space 14. The connecting portion between the first initial contact portion 12221 and the first charging contact portion 12222 is in elastic to the third fixing portion 241, and the first charging contact portion 12222 is in elastic contact with the first convex portion 243. The connecting portion between the second initial contact portion 1322 and the second charging contact portion 1321 is in elastic connect with the fourth fixing portion 251, and the second charging contact portion 1321 is in elastic contact with the second convex portion 253. The tapered portion 23 matches the shape of the tapered opening 15.

The first elastic terminal 122 and the third elastic terminal 24 are in elastic contact, and there are two contact portions between the first elastic terminal 122 and the third elastic terminal 24. The connecting portion of the first initial contact portion 12221 and the first charging contact portion 12222 jams the first convex portion. The second elastic terminal and the fourth elastic terminal are in elastic contact, and there are two contact portions between the second elastic terminal and the fourth elastic terminal. The connecting portion between the second initial contact portion and the second charging contact portion jams the second convex portion. This kind of design not only ensures the stability of the contact, but also prevents the second charging assembly from falling off from the first charging assembly.

In some embodiment of the present invention, the first elastic terminal 122, the second elastic terminal, the third elastic terminal 24, and the fourth elastic terminal are all bent metal sheets.

Although the embodiment of the present inventions are described in detail above, it is obvious to those skilled in the art that various modifications and changes can be made to these embodiments. However, it should be understood that modifications and changes fall within the scope and spirit of the present invention described in the claims. Moreover, the present invention described herein may have other embodiments, and may be implemented or realized in various ways.

The invention claimed is:

1. A charging coupling for a robotic device, comprising:
a first charging assembly, the first charging assembly including a first elastic terminal and a second elastic terminal, a receiving space being formed between the first elastic terminal and the second elastic terminal, a tapered opening being provided on one side of the first charging assembly, the tapered opening communicating with the receiving space;
a second charging assembly adapted to the first charging assembly, one side of the second charging assembly being provided with a protrusion, a third elastic terminal and a fourth elastic terminal disposed on the protrusion, the third elastic terminal including a first convex portion and fourth elastic terminal including a second convex portion, and the convex portion being used for inserting into the receiving space from the tapered opening,
so that the first elastic terminal and the second elastic terminal are respectively in elastic contact with the third elastic terminal and the fourth elastic terminal;
wherein the protrusion comprises a terminal fixing assembly, the terminal fixing assembly comprising:
a first fixing plate, a second fixing plate and a built-in plate, the first fixing plate and the second fixing plate being arranged on both sides of the built-in plate;
a first embedded groove provided between the first fixing plate and the built-in plate;
a second embedded groove provided between the second fixed plate and the built-in plate;
a first fixed buckle provided on a side of the first fixing plate facing away from the built-in plate; and
a first baffle provided in the first embedded groove;
wherein the third elastic terminal further comprises:
a first fixing port detachably connected to the first fixed buckle; and
a first hook portion embedded in the first embedded groove and provided with a first blocking opening;
wherein the first baffle is matched with the first blocking opening, so that the first hook portion is prevented from moving up and down.

2. The charging coupling according to claim 1, wherein the elastic terminals are all bent metal sheets.

3. The charging coupling according to claim 1, wherein the first elastic terminal includes a first fixing portion and a first contact portion, and the first contact portion includes a first initial contact portion and a first charging contact portion, the first charging contact portion being connected to the first fixing portion through the first initial contact portion.

4. The charging coupling according to claim 3, wherein the second elastic terminal includes a second fixing portion and a second contact portion, and the second contact portion includes a second initial contact portion and a second initial contact portion, the second charging contact portion being connected to the second fixing portion through the second initial contact portion.

5. The charging coupling according to claim 4, wherein an angle between the first charging contact portion and the second charging contact portion is smaller than that between the first initial contact portion and the second charging contact portion, the angle between the initial contact portion and the second initial contact portion is smaller than that of the tapered opening.

6. The charging coupling according to claim 4, wherein the first contact portion further comprises a first bent tail portion, the first bent tail portion is connected to the first charging contact portion, and the second contact portion further includes a second bent tail portion, the second bent tail being connected to the second charging contact portion, and the first bent tail portion and the second bent tail portion both facing away from the receiving space.

7. The charging coupling according to claim 1, wherein the third elastic terminal is hook-shaped, the third elastic terminal including a third fixing portion, the first convex portion being located at one end of the third fixing portion connected with the first hook portion, and the other end of the third fixing portion being provided with the first fixing port.

8. The charging coupling according to claim 1, wherein the terminal fixing assembly further comprises:
 a second fixing buckle provided on a side of the second fixed plate facing away from the built-in plate; and
 a second baffle provided in the second embedded groove;
 the fourth elastic terminal further comprises:
 a second fixing port detachably connected to the second fixed buckle; and
 a second hook portion embedded in the second embedded groove and provided with a second blocking opening;
 wherein the second baffle is matched with the second blocking opening, so that the second hook portion is prevented from moving up and down.

9. The charging coupling according to claim 8, wherein the fourth elastic terminal is hook-shaped, the fourth elastic terminal including a fourth fixing portion, the second convex portion being located at one end of the fourth fixing portion connected with the second hook portion, and the other end of the fourth fixing part being provided with the second fixing port.

\* \* \* \* \*